Jan. 12, 1954

H. S. TOBEY 2,665,488

MANDIBLE POSITIONING GAUGE

Filed Aug. 5, 1952

INVENTOR
HYMAN S. TOBEY,

BY
McMorrow, Berman + Davidson
ATTORNEYS

Patented Jan. 12, 1954

2,665,488

UNITED STATES PATENT OFFICE 2,665,488

MANDIBLE POSITIONING GAUGE

Hyman S. Tobey, Plainfield, N. J.

Application August 5, 1952, Serial No. 302,672

4 Claims. (Cl. 33—148)

This invention relates to a mandible positioning gauge and more particularly to an adjustable gauge for determining the rest and occlusal positions of the mandible in fitting dentures.

It is among the objects of the invention to provide an improved gauge for use by dentists for determining the rest and occlusal positions of the lower jaw or mandible in fitting dentures; which is adjustable so that both positions of the mandible can be determined with the same instrument and variations in mandible positions among different patients compensated for; which is safe and easy to use and accurate in use; and which is simple and durable in construction, economical to manufacture, and neat and attractive in appearance.

Other objects and advantages will become apparent from a consideration of the following description and the appended claims in conjunction with the accompanying drawing wherein:

Figure 1:
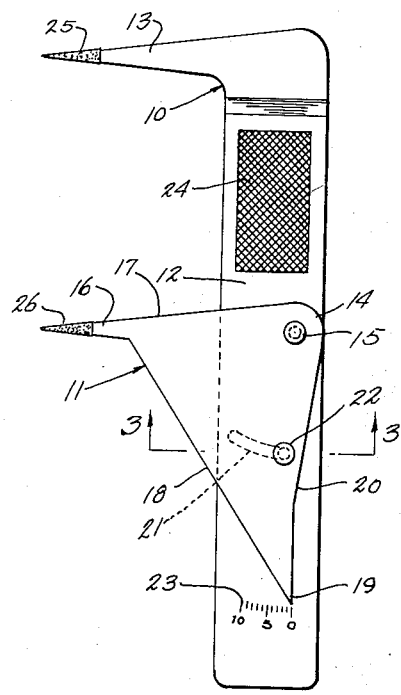
Figure 1 is a side elevational view of a gauge illustrative of the invention.
Figure 2:
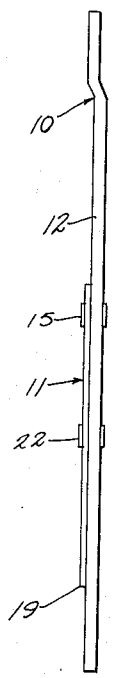
Fig. 2 is a rear elevational view of the gauge illustrated in Figure 1.
Figure 3:
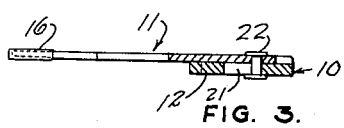
Figure 3 is a transverse cross sectional view on the line 3—3 of Figure 1.

With continued reference to the drawing, the gauge comprises, in general, a first body 10 and a second body 11 pivotally mounted on the first body.

The first body 10 includes a portion 12 of elongated, rectangular shape constituting the shank and handle of the gauge, and a jaw 13 projecting substantially perpendicularly from the portion 12 at one end of this portion and tapering in its dimension longitudinally of the portion 12 from its proximal to its distal end.

The second body 11 is of substantially triangular shape and is disposed against one side of the portion 12 of the body 10. An aperture is provided in the second body 11 adjacent one corner 14 thereof and registers with an aperture provided in the portion 12 of the body 10 intermediate the length of the portion 12 and near the longitudinal edge of this portion remote from the jaw 13 and registers with the aperture in the body 11. A rivet 15 extends through the registering apertures in the body 11 and the portion 12 of the body 10 and pivotally connects the body 11 to the body 10 in a manner such that the body 11 extends beyond the longitudinal edge of the portion 12 of the body 10 adjacent the jaw 13 and extends from the rivet 15 in a direction away from the jaw 13 on the body 10.

A jaw 16 projects from the corner of the body 11 disposed outwardly of the side edge of the body portion 12 adjacent the jaw 13 and this jaw 16 also tapers in its dimension longitudinally of the body portion 12 from its proximal to its distal end. One edge 17 of the flat body 11 constitutes a substantially straight line extending from the corner 14 at which the body 11 is pivotally connected to the body 10 to the distal end of the jaw 16 and the edge 18 of the body 11 constitutes a substantially straight line extending from the proximal end of the jaw 16 to the third corner 19 of the triangular body. The third edge 20 of the body 11 extends from the corner 14 to the corner 19.

With this arrangement, the jaw 16 on the second body 11 is spaced from and opposed to the jaw 13 on the first body 10 and the distal end of the jaw 16 is movable toward and away from the distal end of the jaw 13 when the second body 11 is pivoted about its pivotal connection 15 with the first body 10.

An arcuately curved closed slot 21 extends transversely of the portion 12 of the body 10 at a location spaced from the side of the rivet 15 remote from the jaw 13 and a rivet 22 extends through an aperture in the body 11 and through the slot 21 to provide frictional resistance to movement of the body 11 relative to the body 10.

An arcuately curved scale 23 of lineal measurement is provided on the side of the body portion 12 against which the body 11 is disposed and adjacent the corner 19 of the body 11, and this scale cooperates with the sharp corner 19 of the body 11 to indicate variations in the distance between the distal ends of the jaws 13 and 16 of the gauge. This scale preferably indicates variations in the distance between the distal ends of the jaws 13 and 16 in millimeters, so that the dentist can use these measurements directly without conversion or interpolation.

Figure 4:
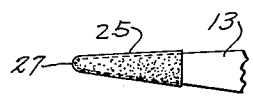
Figure 4 is a bottom plan view of a fragmentary portion of the gauge showing a structural detail thereof.

A portion of the body portion 12 between the body 11 and the jaw 13 is knurled or roughened, as indicated at 24, to provide a finger grip on the body portion 12 for convenience in using the instrument, and the distal end portions of the jaws 13 and 16 are sand blasted to provide slightly roughened surfaces, as indicated at 25 and 26, for retaining thereon a dye which is applied to the distal ends of the instrument jaws in the use of the instrument. At their distal ends the jaws are tapered in thickness, as well as in width, and are slightly rounded, as indicated at 27 in Figure 4, rather than pointed, so that they can be placed against the skin of a patient's face without any danger of injury to the skin and without causing any discomfort to the patient.

In the use of the device, with the member 11 set relative to the member 10, so that the corner 19 of the member 11 is opposite the zero mark on the scale 23 of lineal measurement, as illustrated in Figure 1, and, with the patient's face in a relaxed condition, with the mandible at its position of rest, the distal ends of the jaws 13 and 16 are dipped in a color solution or dye and, with the instrument held in a vertical position, the distal ends or points of the jaws are touched to the patient's face to apply two dots of color to the skin, one dot being located directly lateral to the ala of the nose, and the other on the chin at a location spaced somewhat from the center of the chin. This process is repeated several times with the point of the upper jaw 13 being always placed on the dot first applied to the skin adjacent the nose until a definite location for the point of the lower jaw 16 is found on the chin at the rest position of the mandible. In an upper and lower denture case the wax bite of a lower denture to be fitted is then thoroughly warmed and softened and placed in the patient's mouth. The gauge is adjusted, so that the distal ends or points of the jaws 13 and 16 are moved together a predetermined distance, for example, from two to three millimeters, and, with the point of the upper jaw 13 held on the dot adjacent the patient's nose, the patient is required to raise his lower jaw or mandible until the point of the lower jaw of the instrument coincides with the dot previously determined on the patient's chin. This will give a comfortable occlusal position for the mandible and will provide a freeway of the proper magnitude between the teeth when the mandible is at its rest position. The method can be carried out by this instrument to fit full upper and lower dentures or to fit an upper or a lower denture to natural teeth remaining in the complementary lower or upper jaw of the patient.

Both of the bodies 10 and 11 are preferably formed of a corrosion resistant sheet material having the necessary structural strength and rigidity for the intended purpose. Materials particularly adapted to this use are sheet aluminum, stainless steel and synthetic resin plastic.

The instruments or gauges may be made in various sizes for use on patients having large, medium or small facial structures, and may be otherwise varied within practical limits without in any way exceeding the scope of the invention.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A gauge for use in fitting dentures comprising a first flat body of elongated rectangular shape having a first jaw extending substantially perpendicularly therefrom at one end thereof and tapering in a direction away from the body, a second flat body of substantially triangular shape disposed against one side of said first body and having an outwardly tapering second jaw projecting from one corner thereof, pivot means pivotally connecting said second body adjacent a second corner thereof to said first body intermediate the length of the latter in a manner such that said second jaw is spaced from and opposed to said first jaw and said second body extends from said pivot means in a direction away from said first jaw, and a scale of lineal measurement on said first body adjacent the third corner of said triangular second body indicating differences in the distance between the distal ends of said first and second jaws, said jaws having roughened surfaces at their distal ends to retain a liquid dye thereon.

2. A gauge for use in fitting dentures comprising a first flat body of elongated rectangular shape having a first jaw extending substantially perpendicularly therefrom at one end thereof and tapering in a direction away from the body, a second flat body of substantially triangular shape disposed against one side of said first body and having an outwardly tapering second jaw projecting from one corner thereof, pivot means pivotally connecting said second body adjacent a second corner thereof to said first body intermediate the length of the latter in a manner such that said second jaw is spaced from and opposed to said first jaw and said second body extends from said pivot means in a direction away from said first jaw, and a scale of lineal measurement on said first body adjacent the third corner of said triangular second body indicating differences in the distance between the distal ends of said first and second jaws, said jaws having roughened surfaces at their distal ends to retain a liquid dye thereon and having their distal ends smoothly rounded for contact with the skin of a patient without injury or discomfort to the patient.

3. A gauge for use in fitting dentures comprising an elongated body, jaws extending in the same direction from said body and spaced apart in mutually opposed relationship to each other and having substantially pointed outer ends provided with means for carrying a dye material, said jaws being relatively movable toward and away from each other, and means carried by said body and at least one of said jaws indicating in units of lineal measurement the extent of variations in the distance between the outer ends of said jaws.

4. A gauge for use in fitting dentures comprising an elongated body, jaws extending in the same direction from said body and spaced apart in mutually opposed relationship to each other and having substantially pointed outer ends provided with means for carrying a dye material, said jaws being relatively movable toward and away from each other, and means carried by said body and at least one of said jaws indicating in units of lineal measurement the extent of variations in the distance between the outer ends of said jaws, the outer ends of said jaws being spaced apart a distance corresponding to the average distance on an adult human face from the ala of the nose to the center of the chin.

HYMAN S. TOBEY.

References Cited in the file of this patent

UNITED STATES PATENTS

| Number | Name | Date |
|---|---|---|
| 1,298,866 | Beach | Apr. 1, 1919 |
| 1,328,007 | Mannon et al. | Jan. 13, 1920 |
| 1,455,708 | Brown | May 15, 1923 |
| 1,589,973 | Landa | June 22, 1926 |
| 1,804,567 | Pray | May 12, 1931 |
| 2,561,020 | Gerber | July 17, 1951 |
| 2,562,224 | Weyrick | July 31, 1951 |
| 2,582,898 | Baldwin | Jan. 15, 1952 |

FOREIGN PATENTS

| Number | Country | Date |
|---|---|---|
| 14,300 | Great Britain | June 20, 1913 |